US010028204B2

(12) United States Patent
Blankenship et al.

(10) Patent No.: US 10,028,204 B2
(45) Date of Patent: Jul. 17, 2018

(54) SUPPORTING DEVICE-TO-DEVICE COMMUNICATION IN A RICH COMMUNICATION SERVICE CONTEXT

(71) Applicant: BlackBerry Limited, Waterloo (CA)

(72) Inventors: Yufei Wu Blankenship, Kildeer, IL (US); David Stuart Furbeck, Keller, TX (US)

(73) Assignee: BlackBerry Limited, Waterloo, Ontario (CA)

(*) Notice: Subject to any disclaimer, the term of this patent is extended or adjusted under 35 U.S.C. 154(b) by 130 days.

(21) Appl. No.: 13/837,199

(22) Filed: Mar. 15, 2013

(65) Prior Publication Data

US 2014/0057667 A1 Feb. 27, 2014

Related U.S. Application Data

(60) Provisional application No. 61/693,129, filed on Aug. 24, 2012.

(51) Int. Cl.
H04B 7/00 (2006.01)
H04M 1/00 (2006.01)
(Continued)

(52) U.S. Cl.
CPC ........... H04W 48/16 (2013.01); H04L 67/303 (2013.01); H04W 4/023 (2013.01); H04W 8/005 (2013.01);
(Continued)

(58) Field of Classification Search
CPC ............ H04L 61/2069; H04L 65/1016; H04L 65/1063; H04L 65/1073; H04L 65/40;
(Continued)

(56) References Cited

U.S. PATENT DOCUMENTS 6,985,242 B1\* 1/2006 Toyoda ........................ 358/1.15
7,729,298 B2\* 6/2010 Velagaleti et al. ............ 370/260
(Continued)

FOREIGN PATENT DOCUMENTS

GB 2488120 8/2012

OTHER PUBLICATIONS

"Rich Communication Suite 5.0 Advanced Communications; Services and Client Specification; Version 1.0," GSM Association, Official Document, Apr. 19, 2012 (336 pages).
(Continued)

Primary Examiner — Yuwen Pan
Assistant Examiner — Paul P Tran
(74) Attorney, Agent, or Firm — Fish & Richardson P.C.

(57) ABSTRACT

Methods, apparatus and articles of manufacture to support device-to-device communication in a rich communication service context are disclosed. Some example methods disclosed herein include sending, to a network node, first device-to-device capability information for a first device, the first device-to-device capability information being associated with device-to-device functionality supported by the first device, and receiving, from the network node, second device-to-device capability information for a second device associated with a contact stored in the first device, the second device-to-device capability information being associated with device-to-device functionality supported by the second device. Other example methods disclosed herein include receiving, from a first device, first device-to-device capability information for the first device, and sending, to the first device, second device-to-device capability information for a second device associated with a contact stored in the first device.

14 Claims, 6 Drawing Sheets

(51) Int. Cl.
*H04L 12/28* (2006.01)
*H04L 12/16* (2006.01)
*H04W 4/00* (2018.01)
*H04L 12/66* (2006.01)
*G06F 15/16* (2006.01)
*H04W 48/16* (2009.01)
*H04W 4/02* (2018.01)
*H04L 29/08* (2006.01)
*H04W 8/00* (2009.01)
*H04W 76/14* (2018.01)
*H04W 28/16* (2009.01)
*H04L 12/58* (2006.01)
*H04M 3/42* (2006.01)
*H04W 8/22* (2009.01)

(52) U.S. Cl.
CPC .......... *H04W 76/14* (2018.02); *H04L 51/043* (2013.01); *H04M 3/42* (2013.01); *H04W 8/22* (2013.01); *H04W 28/16* (2013.01)

(58) Field of Classification Search
CPC ... H04L 65/4038; H04L 67/24; H04L 67/303; H04L 67/306; H04L 69/24; H04L 67/04; H04L 67/26; H04L 41/0803; H04L 12/28; H04L 12/5812; H04L 45/02; H04L 67/104; H04L 67/14; H04L 67/16; H04L 5/0016; H04L 5/0035; H04L 27/261; H04L 65/10; H04L 51/043; H04L 51/20; H04M 1/7253; H04M 1/72544; H04M 7/0024; H04M 7/0072; H04M 3/42; H04M 7/123; H04N 21/41407; H04N 21/4788; H04N 21/6181; H04N 21/6131; H04N 1/00244; H04W 4/16; H04W 28/0247; H04W 28/16; H04W 28/18; H04W 28/20; H04W 28/22; H04W 28/26; H04W 8/005; H04W 8/18; H04W 16/18; H04W 48/16; H04W 72/048; H04W 76/023; H04W 16/14; H04W 4/023; H04W 4/80; H04W 8/22; H04W 28/02; H04W 48/20; H04W 72/02; G06Q 10/10
USPC .... 455/419, 435.1, 466, 500, 518, 519, 566; 370/259, 260, 310, 328, 329, 352, 354, 370/355, 401, 465; 379/100.06, 67.1; 707/712; 709/203, 204, 206, 217, 227, 709/240
See application file for complete search history.

(56) References Cited

U.S. PATENT DOCUMENTS

| | | | | |
|---|---|---|---|---|
| 2006/0160544 | A1* | 7/2006 | Sun | H04W 8/18 455/456.1 |
| 2006/0291412 | A1* | 12/2006 | Naqvi et al. | 370/328 |
| 2007/0165599 | A1* | 7/2007 | Skog et al. | 370/352 |
| 2007/0211678 | A1* | 9/2007 | Li | H04L 5/0035 370/338 |
| 2007/0232347 | A1* | 10/2007 | Persson | H04L 51/20 455/550.1 |
| 2008/0182589 | A1* | 7/2008 | Buccieri | H04W 4/02 455/456.3 |
| 2008/0317010 | A1* | 12/2008 | Naqvi et al. | 370/355 |
| 2009/0028179 | A1* | 1/2009 | Albal | G06Q 10/10 370/465 |
| 2010/0165882 | A1* | 7/2010 | Palanki | H04W 8/005 370/254 |
| 2011/0022580 | A1 | 1/2011 | Badulescu et al. | |
| 2011/0196925 | A1* | 8/2011 | Hans et al. | 709/204 |
| 2013/0084914 | A1* | 4/2013 | Wu | H04W 76/023 455/525 |
| 2013/0237147 | A1* | 9/2013 | Dearman | H04W 4/206 455/41.1 |
| 2013/0288668 | A1* | 10/2013 | Pragada | H04W 12/06 455/426.1 |
| 2014/0004796 | A1* | 1/2014 | Cakulev | H04W 76/023 455/41.2 |
| 2014/0031028 | A1 | 1/2014 | Yamada et al. | |
| 2014/0256334 | A1* | 9/2014 | Kazmi | H04W 28/18 455/450 |

OTHER PUBLICATIONS

"Rich Communication Suite 5.1 Advanced Communications; Services and Client Specification; Version 1.0," GSM Association, Official Document, Aug. 13, 2012 (433 pages).

"RCS-e—Advanced Communications: Services and Client Specification; Version 1.2.2." GSM Association, Official Document RCS-e, Jul. 4, 2012 (169 pages).

"3rd Generation Partnership Project' Technical Specification Group Services and System Aspects; Vocabulary for 3GPP Specifications (Release 11)," 3GPP TR 21.905 V11.1.0, Jun. 2012 (64 pages).

"3rd Generation Partnership Project; Technical Specification Group SA; Feasibility Study for Proximity Services (ProSe) (Release 12)," 3GPP TR 22.803 V1.0.0, Aug. 2012 (33 pages).

"3rd Generation Partnership Project; Technical Specification Group Radio Access Network; Evolved Universal Terrestrial Radio Access (E-UTRA); LTE Positioning Protocol (LPP) (Release 10)," 3GPP TS 36.355 V10.3.0, Sep. 2011 (115 pages).

Wikipedia, "System Architecture Evolution," retrieved from http://en.wikipedia.org/wiki/System_Architecture_Evolution on Mar. 10, 2013 (8 pages).

Patent Cooperation Treaty, "International Search Report," issued in connection with International Patent Application No. PCT/US2013/049292, dated Nov. 14, 2013 (3 pages).

Patent Cooperation Treaty, "Written Opinion of the International Search Authority," issued in connection with International Patent Application No. PCT/US2013/049292, dated Nov. 14, 2013 (6 pages).

"Study on LTE Direct Communication," 3GPPTM Work Item Description, 3GPP TSG RAN Meeting #56 RP-120698, Ljubljana, Slovenia Jun. 13-15, 2012 (5 pages).

"Study on LTE Device to Device Proximity Discovery," 3GPP™ Work Item Description, 3GPP TSG RAN Meeting #56 RP-120872, Ljubljana, Slovenia Jun. 13-15, 2012 (6 pages).

"3rd Generation Partnership Project; Technical Specification Group SA; Feasibility Study for Proximity Services (ProSe) (Release 12)," 3GPP TR 22.803 V0.3.0, May 2012 (24 pages).

International Preliminary Report on Patentability for PCT Application No. PCT/US2013/049292, dated Feb. 24, 2015, 7 pages.

European Search Report and Written Opinion (Communication pursuant to Article 94(3) EPC) in European Application No. 13741912.3 dated Feb. 15, 2018, 7 pages.

* cited by examiner

SUPPORTING DEVICE-TO-DEVICE COMMUNICATION IN A RICH COMMUNICATION SERVICE CONTEXT

RELATED APPLICATION(S)

This patent claims priority from U.S. Provisional Application Ser. No. 61/693,129, entitled "ENHANCED RICH COMMUNICATION SERVICES WITH DEVICE-TO-DEVICE COMMUNICATION SUPPORT" and filed on Aug. 24, 2012. U.S. Provisional Application Ser. No. 61/693,129 is hereby incorporated by reference in its entirety.

FIELD OF THE DISCLOSURE

This disclosure relates generally to communication systems and, more particularly, to supporting device-to-device communication in a rich communication service context.

BACKGROUND

Rich communication services, also referred to as the rich communication suite, refer to a set of services, in addition to conventional voice service, created by the Global System for Mobile Communications Association (GSMA). The rich communication services being created by the GSMA are based on combining services defined by the Third Generation Partnership Project (3GPP) and the Open Mobile Alliance (OMA) to further harness the benefits of the 3GPP Internet Protocol (IP) Multimedia Subsystem (IMS). Such rich communication services include, for example, instant messaging, video and image sharing, video calling, etc. In general, to invoke these rich communication services in a user's mobile device, the user interface entry point is the enhanced address book (EAB) specified by OMA. Device-to-device communication capability, by which two or more user devices in proximity to each other can establish direct connections and support applications and services over these connections, is not yet supported in the rich communication services framework.

BRIEF DESCRIPTION OF THE DRAWINGS

To clarify multiple layers and regions, the thickness of the layers are enlarged in the drawings. Wherever possible, the same reference numbers will be used throughout the drawing(s) and accompanying written description to refer to the same or like parts, elements, etc.

DETAILED DESCRIPTION

Figure 1:
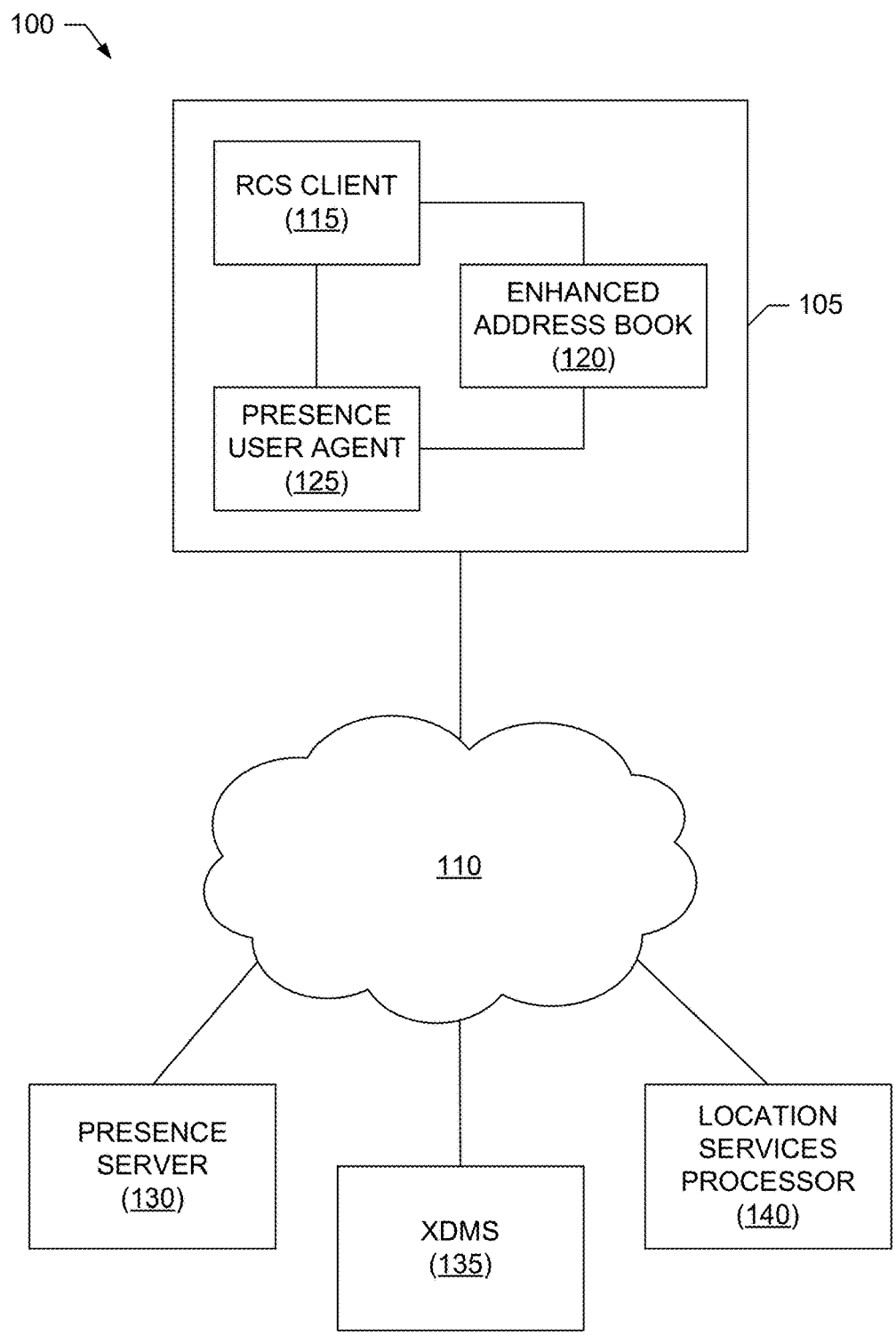
FIG. 1 is a block diagram of a first example system supporting device-to-device communication in a rich communication service context as disclosed herein.

Example methods, apparatus and articles of manufacture (e.g., storage media) to support device-to-device communication in a rich communication service context are disclosed herein. Example methods disclosed herein that can be performed by a first device include publishing, to a network node, first device-to-device capability information for the first device. In such examples, the first device-to-device capability information is associated with device-to-device functionality supported by the first device. Such example methods can also include receiving, at the first device and from the network node, second device-to-device capability information for a second device associated with a contact in an address book of the first device. A typical example network node is a presence server. In such examples, the second device-to-device capability information is associated with device-to-device functionality supported by the second device. Some such example methods can further include using the second device-to-device capability information to indicate in an entry of the address book associated with the contact whether the second device is discoverable.

In some such examples methods, the first device-to-device capability information indicates whether the first device is able to discover one or more other devices in proximity to the first device. Additionally or alternatively, in some such example methods, the first device-to-device capability information indicates whether the first device is to be discoverable by the one or more other devices in proximity to the first device.

Additionally or alternatively, in some such example methods, the first device-to-device capability information includes discovery capability information. Also, these example methods can further include specifying the discovery capability information in the first device. A typical example is to link such capability information with the address book the first device. For example, the discovery capability information can include at least one of: (a) a first discovery capability specifying that the first device is able to discover one or more other devices and that the first device is to be discoverable by the one or more other devices; (b) a second discovery capability specifying that the first device is able to discover the one or more other devices, but that the first device is not be discoverable by the one or more other devices; (c) a third discovery capability specifying that the device is not to discover the one or more other devices, but that the first device is to be discoverable by the one or more other devices; or (d) a fourth discovery capability specifying that the first device is not to discover the one or more other devices and that the first device is not to be discoverable by the one or more other devices. Also, in some such example methods, specifying the discovery capability information in the address book of the first device can include associating first discovery capability information for the first device with a first contact in the address book, and associating second discovery capability information for the first device with a second contact in the address book, where the second discovery capability information is different from the first discovery capability information.

Additionally or alternatively, in some such example methods, the first device-to-device capability information includes communication capability information. Also, these example methods can further include specifying the communication capability information in the address book of the first device. For example, the communication capability information can include at least one of: (a) a first communication capability specifying that the first device is able to perform device-to-device communication via only a first type of radio access technology (RAT); (b) a second communication capability specifying that the first device is able to perform device-to-device communication via a plurality of types of RATs; or (c) a third communication capability specifying that the first device does not perform device-to-device communication via any type of RAT. Also, in some such example methods, specifying the communication capability information in the address book of the first device can include associating first communication capability information for the first device with a first contact in the address book, and associating second communication capability information for the first device with a second contact in the address book For example, the second communication capability information can be different from the first communication capability information.

Additionally or alternatively, some such example methods can further include determining, based on at least one of the first device-to-device capability information or the second device-to-device capability information, whether the second device is discoverable by the first device. When the second device is discoverable by the first device, such example methods can also include detecting whether the second device is in proximity to the first device. When the second devices is detected to be in proximity to the first device, such example methods can further include setting an indicator in the address book of the first device to indicate that a proximity service associated with the second device is available.

Additionally or alternatively, some such example methods can further include discovering the second device. Such example methods can also include determining proximity information relative to the second device; and reporting the proximity information to a location service processor.

Other example methods disclosed herein that can be performed by a network include receiving, from a first device, first device-to-device capability information for the first device. In such examples, the first device-to-device capability information is associated with device-to-device functionality supported by the first device. Such example methods can also include sending, to the first device, presence information including second device-to-device capability information for a second device associated with a contact in an address book of the first device. In such example methods, the second device-to-device capability information is associated with device-to-device functionality supported by the second device.

In some such examples methods, the first device-to-device capability information indicates whether the first device is able to discover one or more other devices in proximity to the first device. Additionally or alternatively, in some such example methods, the first device-to-device capability information indicates whether the first device is to be discoverable by the one or more other devices in proximity to the first device.

Additionally or alternatively, in some such example methods, the first device-to-device capability information includes discovery capability information. For example, the discovery capability information can include at least one of: (a) a first discovery capability specifying that the first device is able to discover one or more other devices and that the first device is to be discoverable by the one or more other devices; (b) a second discovery capability specifying that the first device is able to discover the one or more other devices, but that the first device is not be discoverable by the one or more other devices; (c) a third discovery capability specifying that the device is not to discover the one or more other devices, but that the first device is to be discoverable by the one or more other devices; or (d) a fourth discovery capability specifying that the first device is not to discover the one or more other devices and that the first device is not to be discoverable by the one or more other devices.

Additionally or alternatively, in some such example methods, the first device-to-device capability information includes communication capability information. For example, the communication capability information can include at least one of: (a) a first communication capability specifying that the first device is able to perform device-to-device communication via only a first type of radio access technology (RAT); (b) a second communication capability specifying that the first device is able to perform device-to-device communication via a plurality of types of RATs; or (c) a third communication capability specifying that the first device does not perform device-to-device communication via any type of RAT.

Additionally or alternatively, in some such example methods, the first device-to-device capability information is stored in a first presence document associated with the first device. Furthermore, some such example methods can include receiving, from the first device, a privacy filtering rule associated with the device-to-device functionality supported by the first device. Such example methods can also include storing the privacy filtering rule with presence authorization rules associated with the first presence document. Such example methods can further include evaluating the privacy filtering rule when providing presence information, including at least a portion of the first device-to-device capability information, to a third device.

Additionally or alternatively, some such example methods further include receiving proximity information from the first device. For example, the proximity information can indicate whether the second device is in proximity to the first device. Such example methods can also include augmenting positioning information determined for the second device with the proximity information received from the first device to determine a position of the first device.

In these and other example methods, the first and second device can be mobile or stationary. Without losing generality, in the following, the description uses mobile devices as an example. Further, although for simplicity the following disclosure describes examples involving individual devices, it is appreciated by those skilled in the art that the methods can be applied to groups. For example, the second device may belong to an identifiable group, and the first device may apply the example methods to all devices in this identifiable group. For example, the first device can link device-to-device communication information to the group stored in the address book.

These and other example methods, apparatus, systems and articles of manufacture (e.g., storage media) to support device-to-device communication in a rich communication service context are disclosed in greater detail below.

Turning to the figures, a block diagram of an example system 100 supporting device-to-device communication in a rich communication service context as disclosed herein is illustrated in FIG. 1. The example system 100 of FIG. 1 includes an example user device 105 in communication with an example communication network 110. In the illustrated example of FIG. 1, the user device 105 and the communication network 110 support rich communication services (RCS) as defined by the GSMA. The example user device 105 can be implemented by, for example, any type(s) and/or number of mobile devices, such as a smartphone, a mobile telephone device that is portable, a mobile telephone device implementing a stationary telephone, a personal digital assistant (PDA), a computer, a gateway, etc., or any other type of user equipment (UE). The example communication network 110 can be implemented by any type(s) and/or number communications networks, such as, for example, a 3GPP long term evolution (LTE) network and/or any other type of network having RCS support.

To support RCS, the example user device 105 includes an example RCS client 115, an example enhanced address book (EAB) 120 and an example presence user agent (UA) 125, and the example network 110 includes an example presence server 130, an example extensible markup language (XML) document management server (XDMS) 135 and an example location services processor 140. In the illustrated example, the RCS client 115, the EAB 120, the presence UA 125, the presence server 130, the XDMS 135 and the location services processor 140 are also adapted, as disclosed herein, to support device-to-device (D2D) communications as a further service in the RCS context. As noted above, D2D communications, also referred to as proximity services in the 3GPP standards, involve the user device 105 establishing a direct connection with another user device (not shown) when the devices are in proximity to each other. The devices can then exchange data (e.g., such as media data) over this direct connection to support D2D applications and/or services, referred to as proximity services herein. The D2D communication link established between two devices in proximity can be implemented by, for example, a wireless local area network (WLAN) connection, a Bluetooth connection, a near field communications (NFC) connection, a communication link using available bandwidth from the network 110, etc., or any combination thereof. In general, proximity-based services are based on an awareness that two devices or users are in proximity (e.g., are close) to each other. Media file sharing, playlist sharing, etc., are just some examples of the types of proximity services that can be supported over a D2D communication link between the user device 105 and another device. D2D communications can also provide communication capability to public safety personnel when, for example, connectivity with the network infrastructure is compromised in a disaster scenario.

As described in greater detail below, the disclosed example system 100 builds on the capability discovery framework of RCS to support D2D communications as a further RCS feature. For example, under the capability discovery framework of RCS, a user can use the RCS client 115 to scroll through the EAB 120 of the user device 105 and select an RCS contact. The RCS client 115 then performs an RCS capability check and displays the service(s) that is (are) available for the selected RCS contact. The RCS client 115 can discover a contact's RCS service capabilities using, for example, a session initiation protocol (SIP) OPTIONS request and/or by using a presence-based solution. For the SIP OPTIONS based mechanism of capability discovery, a peer-to-peer message is exchanged between RCS clients, as described in greater detail below.

In an example presence-based solution, a user device, such as the user device 105, announces its RCS capabilities in a presence document that is published by using, for example, the SIP PUBLISH method. For example, when the user device 105 is started, the RCS client 115 can send a SIP PUBLISH request to the presence server 130 containing the RCS capabilities of the user device 105. This publication of RCS capabilities is maintained by the presence server 130 (e.g., in a presence document stored on the XDMS 135), and can be updated by the RCS client 115 of the user device 105 by sending subsequent SIP PUBLISH request(s) (e.g., before a prior publication expires). The RCS capabilities of the user device 105 can be retrieved by another RCS user device via a presence subscription issued by the device's RCS client, provided that any relevant presence authorization rules allow the RCS client to do so.

In the illustrated example of FIG. 1, the network 105 uses the XDMS 135 to store, for example, presence-related data, including RCS capability data, defined by presentities, which is a term that refers to the entities (e.g., such as a user of the user device 105) providing presence information to the network. Examples of presence-related data that can be defined by presentities includes, but is not limited to, presence authorization policies, presence hard states, resource lists (e.g., group and buddy-list data), etc. In the illustrated example, data is exchanged with the XDMS 135 using the XML configuration access protocol (XCAP), which is an application layer protocol that maps XML document sub-trees and attributes to hypertext transfer protocol (HTTP) uniform resource identifiers (URIs), thereby enabling access to this information via HTTP.

Prior systems supporting RCS assume that RCS services are provided only in the context of the existing cellular network infrastructure, where user devices are wirelessly connected to the base stations only. Prior RCS-capable systems do not provide or support any direct wireless link (e.g., D2D connection) functionality between user devices in an RCS context, even if the devices are in proximity to each other. For example, even if two user devices are wirelessly connected via Bluetooth, WLAN, or NFC, such a direct link between the devices is not recognized in the RCS context in such prior systems.

In contrast with such prior systems, the system 100 supports D2D communications in the RCS context. For example, and as described in greater detail below, the RCS client 115 and the EAB 120 in the example user device 105 of FIG. 1 support integration of D2D discovery and communication capabilities into the EAB 120. D2D capabilities include, for example, D2D discovery capabilities and D2D communication capabilities. D2D discovery capabilities include a device's capability to both discover other user devices and be discovered by other user devices. In addition to the physical capabilities of a particular user device, the D2D discovery capabilities of the device can also take into account, for example, a user's prerogative to be undiscoverable at particular times and/or to particular users, and/or to enable and disable discovery of others. D2D communication capabilities include, for example, the capability of a particular user device to support D2D communications over different radio access technologies, and may take user preferences into account. For example, the user device 105 could be configured to support D2D communications with a first user device via a direct LTE link with the first user device and/or a direct WLAN link with the first user device, but may support D2D communications with a second user device via only a direct WLAN link.

In some examples, the RCS client 115 and the presence UA 125 in the example user device 105 of FIG. 1, and the presence server 130 and XDMS 135 in the example network 110 of FIG. 1, support the inclusion of D2D capability information in presence information provided by the user device 105. For example, and as described in greater detail below, the D2D discovery and communication capabilities for the user device 105 specified by the RCS client 115 in the EAB 120 can be included in presence information published by the presence UA 125 for storage on the presence server 130 and/or XDMS 135.

In some examples, the RCS client 115 and the EAB 120 in the example user device 105 of FIG. 1, and the presence server 130 and XDMS 135 in the example network 110 of FIG. 1, support privacy protection in the context of D2D discovery. For example, and as described in greater detail below, the RCS client 115 can specify whether the user device 105 is discoverable to particular contacts in the EAB 120 (e.g., on a contact-by-contact basis, on a group basis, etc.), and provide this information for the presence server 130 and/or XDMS 135 for use when processing subscriptions to the presence information of the user device 105.

In some examples, the RCS client 115 in the example user device 105 of FIG. 1, and the location services processor 140 in the example network 110 of FIG. 1, support the enhancing of location information using proximity information determined to support D2D communications in the RCS context. For example, and as described in greater detail below, the RCS client 115 can provide proximity information to the location services processor 140, which can use this proximity information to estimate a location of the user device 105 and/or another user device, and/or enhance a location estimate for the user device 105 and/or another user device determined using other position method(s) (e.g., such as via the global positioning system (GPS)).

The example system 100 of FIG. 1 is illustrated as including one example user device 105, one example network 110, one example presence server 130, one example XDMS 135 and one example location services processor 140. However, the example methods, apparatus and articles of manufacture (e.g., storage media) to support D2D communication in a rich communication service context disclosed herein can be used in a system including any number and/or type(s) of such user devices 105, networks 110, presence servers 130, XDMSs 135 and/or location services processors 140. Furthermore, although example methods, apparatus and articles of manufacture to support D2D communication in a rich communication service context are described in the context of the example system 100 of FIG. 1, these examples are not limited thereto. On the contrary, the example methods, apparatus and articles of manufacture disclosed herein can be used to support D2D communications in any communication system capable of supporting D2D capability publishing, D2D device discovery, establishment of D2D links, etc., as disclosed herein.

Figure 2:
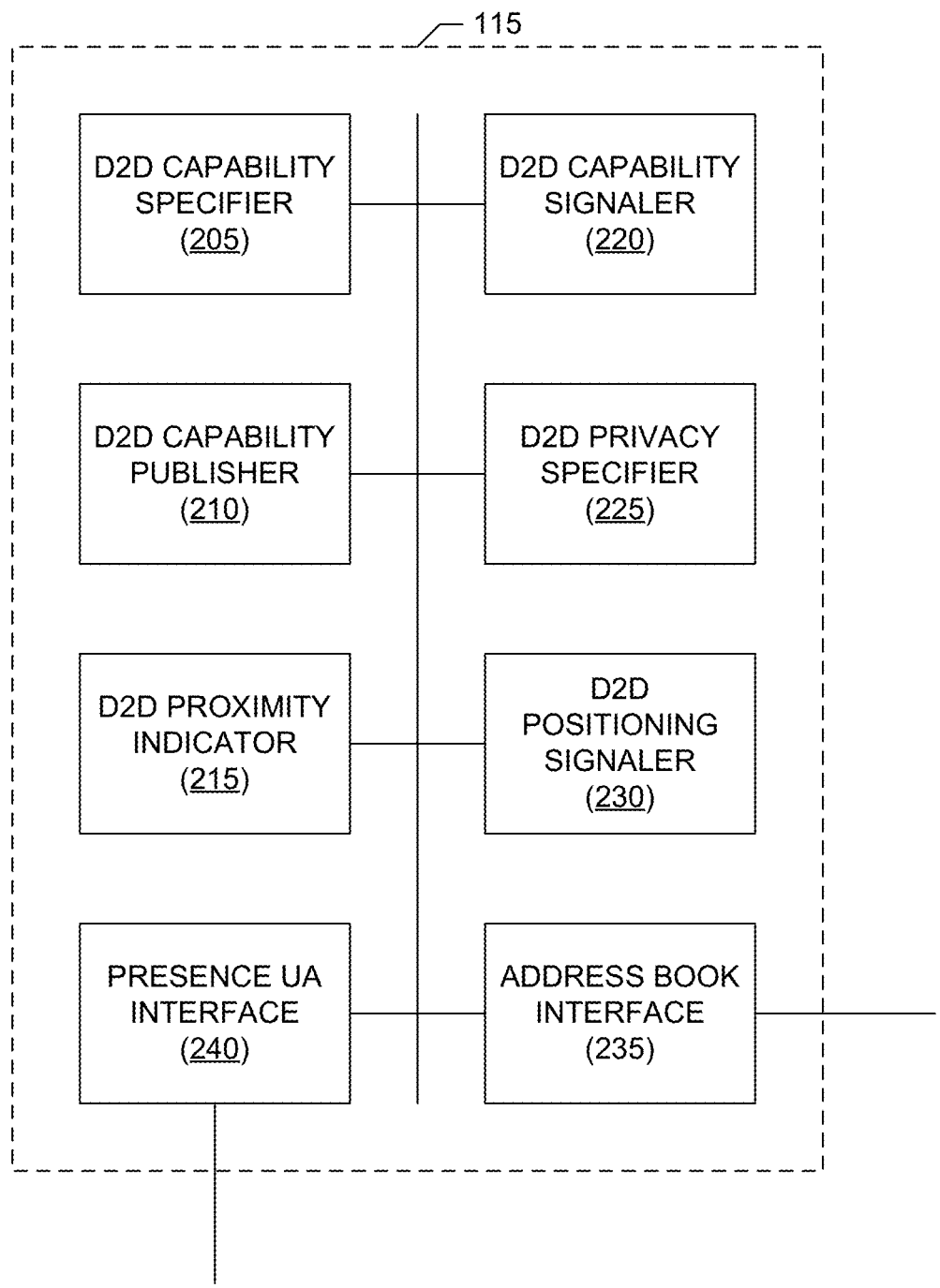
FIG. 2 is a block diagram of an example rich communication services client that may be used to implement an example user device in the first example system of FIG. 1.

A block diagram of an example RCS client 115 that may be used to implement the example RCS client 115 in the example user device 105 of FIG. 1 is illustrated in FIG. 2. The implementation and operation of the RCS client 115 of FIG. 2 is described with reference to implementation and operation in the example user device 105 of FIG. 1. Turning to FIG. 2, the example RCS client 115 illustrated therein includes an example address book interface 235 to enable the RCS client 115 to interface with the EAB 120 of the user device 105. The example RCS client 115 of FIG. 2 also includes an example presence UA interface 240 to enable the RCS client to interface with the presence UA 125 of the user device 105.

Additionally, the example RCS client 115 of FIG. 2 includes an example D2D capability specifier 205 to specify D2D capabilities supported by the user device 105 associated with (e.g., implemented in) the RCS client 115. In an example RCS context, D2D capabilities, also referred to as proximity services (ProSe) capabilities, to support D2D functionality include, but are not limited to, D2D discovery related capabilities and D2D communication capabilities.

Also, in some examples, as a prerequisite to allowing specification of D2D capabilities in general, or for a particular proximity service, the D2D capability specifier 205 checks whether the user device 105 has the physical capability to support D2D functionality (e.g., is D2D capable), or to support the particular proximity service. In some examples, the D2D capability specifier 205 checks whether the user device 105 and the visited public land mobile network (PLMN) in which the user device 105 is operating are D2D capable before the D2D capability specifier 205 deems the user device 105 to be D2D capable. In some examples, this check is performed automatically without any user interface (UI) input, whereas in other examples, this check is triggered by a UI input. In some examples, if the physical capability to support D2D functionality does not exist, then for both D2D discovery and D2D communication capabilities, the D2D capability specifier 205 sets such capabilities to a value of "Not Available," or a similar value.

In the illustrated example, the D2D capability specifier 205 provides a UI by which a user can configure (e.g., activate and deactivate) D2D discovery capabilities from the context of the EAB 120. In some examples, based on user input received via this UI, the D2D capability specifier 205 can specify (e.g., select from) one or more of the following D2D discovery capability options for contacts in the EAB 120:

D(a): Discovering others is permitted and being discovered by others is allowed;

D(b): Discovering others is permitted but being discovered by others is not allowed;

D(c): Discovering others is not permitted but being discovered by others is allowed;

D(d): Discovering others is not permitted and being discovered by others is not allowed.

In some examples, the D2D capability specifier 205 permits specification or association of D2D discovery capabilities only with individual contacts or groups of contacts (or all contacts) existing in the EAB 120 of the user device 105, whereas devices not associated with contacts in the user's EAB 120 are disallowed any proximity service to protect the user's privacy. In other words, the D2D discovery capability D(d) described above can be used by default to control the discovering or being discovered capabilities associated with devices/contacts not in the EAB 120 of the user device 105. Additionally or alternatively, in some examples, when a D2D connection request is received at the user device 105 from another user, the D2D capability specifier 205 enables a user of the user device 105 to determine (e.g., via an input selection) which D2D discovery capability (e.g., which of D(a) through D(d) described above) is to be specified for or otherwise associated with the requesting user. In some examples, a D2D discovery capability setting other than, for example, D(d) can be applied when associated with pre-authorized institutional contacts (e.g., stores, museums, government agencies, etc.), which are not necessarily present in the EAB 120 of the user device 105. For example, an operator of the system 100 could pre-authorize such institutional contacts to have D2D discovery capability (e.g., such as the capability D(b) described above) with user devices (e.g., the user device 105) operating with the network 105, and charge these institutions accordingly. In some examples, along with specifying a D2D discover option, such as one of the options D(a)-D(c) described above, for a contact in the EAB 120, the D2D capability specifier 205 allows the user to activate or deactivate one or more particular proximity services to be allowed with that contact in the EAB 120.

In the illustrated example of FIG. 2, the D2D capability specifier 205 permits a user (e.g., via a UI) to specify D2D communication capabilities, such as the type(s) of radio link(s) (e.g., radio access technologies, or RATs) the user is willing to use and/or the user device 105 is able to support for D2D communications. In some examples, the D2D capability specifier 205 enables the user to select from one or more of the following options:

C(a): Allow D2D communication over a RAT of a 1st specified type only (e.g., over a first type of RAT set to WLAN or some other type of RAT);

C(b): Allow D2D communication over multiple specified types of RATs (e.g., over a first type of RAT set to WLAN or some other type of RAT, and over a second type of RAT set to a cellular type, such as evolved universal terrestrial radio access (UTRA), or some other type of RAT);

C(c): Disallow D2D communication over any RAT type. In some examples, the D2D communication capability option C(c) is the only valid option selectable in connection with D2D discovery capability D(d).

In some examples, the D2D capability selections (e.g., the D2D discovery capability and/or communication capability selections) made by the D2D capability specifier 205 can be different for different contacts in the user's EAB 120. For example, each entry in the address book can have a respective unique (and possibly different) D2D capability setting, or the D2D capability settings could be chosen on a contact group basis. For example, the D2D capability specifier 205 could permit the user to select D(a) for her family member contact group, D(b) for her friends contact group, and D(d) for all other contacts in the EAB 120. As another example, the D2D capability specifier 205 could permit the user to select C(a) for her friends contact group, C(b) for her family contact group, and C(c) for all other contacts in the EAB 120.

The example RCS client 115 of FIG. 2 also includes an example D2D capability publisher 210 to publish the D2D capability information specified by the D2D capability specifier 205 for the user device 105. As described above, RCS capability discovery can be based on social presence information. Thus, in the illustrated example of FIG. 2, the D2D capability publisher 210 enables the D2D capability information for the user device 105 to also be part of the user's social presence information (e.g., along with the other RCS capability information for the user device 105). In some examples, as a prerequisite for publishing D2D capability information, the D2D capability publisher 210 checks that (a) the user device 105 is physically capable of supporting D2D functionality and (b) the PLMN to which the user device 105 is connected provides D2D service. In some examples, the D2D capability publisher 210 relies on the similar check performed by the D2D capability specifier 205, which is described above, for making this determination.

In some examples, the D2D capability publisher 210 causes the presence UA 125 of the user device 105 to publish the D2D discovery capability information for the user device 105 to the presence server 130. For example, the D2D capability publisher 210 can cause the D2D discovery capabilities specifying the capability of the user device 105 to discover others to be published as discovering capabilities as follows. If the user has selected the D2D discovery capability D(a) or D(b) for one or more contacts in the EAB 120, then D2D capability publisher 210 causes the presence UA 125 to publish the user's status as "Discovering" (or a similar status value) to the presence server 130. This status indicates that the user device 105 is able to discover others in its surroundings. For example, the "Discovering" status could indicate that the user device 105 is permitted to discover all other user devices in proximity to the user device 105, or only those contacts and/or contact groups in the EAB 120 for which D2D discovery capability D(a) or D(b) is specified.

If the user has selected the D2D discovery capability D(c) or D(d) for one or more contacts in the EAB 120, then the D2D capability publisher 210 causes the presence UA 125 to publish the user's status as "Not Discovering" (or a similar status value) to the presence server 130. This status indicates that the user device 105 is disabled from discovering others in its surroundings. For example, the "Not discovering" status could indicate that the user device 105 is prohibited from discovering any contact in its EAB 120 (e.g., if D(c) or D(c) is associated with all contacts in its EAB 120) or only those contacts and/or contact groups in the EAB 120 for which D2D discovery capability D(c) or D(d) is specified.

In some examples, deactivation of a particular presence feature (e.g., application or service) in the user device 105 may or may not be differentiated from the situation where the feature does not exist in the user device 105. If these scenarios are to be differentiated, then further differentiators can be shared with the presence server. For example, if the information published by the presence UA 125 to the presence server 130 does not include any selection of D(a)-D(d), then the presence server 130 can interpret this lack of D2D capability information to mean that the user device 105 is not equipped with D2D capability. Otherwise, so long as any of D(a)-D(d) is selected, the presence server 130 interprets this to mean that the user device 105 has D2D capability, and the choice from D(a)-D(d) provides D2D activation/deactivation information. As described above, the D2D discovery capabilities may be configurable in the user device 105.

In some examples, the D2D capability publisher 210 can cause the D2D discovery capabilities specifying the capability of the user device 105 to be discovered by others to be published as discoverable capabilities as follows. If the user has selected the D2D discovery capability D(a) or D(c) for one or more contacts in the EAB 120, then D2D capability publisher 210 causes the presence UA 125 to publish the user's status as "Discoverable" (or a similar status value) to the presence server 130. This status indicates that the user device 105 allows other devices in its surroundings to discover the user device 105. For example, this could mean that the user device 105 can be discovered by any other device in proximity to the user device 105, or only contacts and/or contact groups in the EAB 120 for which D2D discovery capability D(a) or D(c) is specified, and this choice may be configurable in the user device 105 as described above. In some examples, if it has been configured that the user device 105 can be discovered by a subset $S_0$ of the contacts in the EAB 120, then the presence server 130 notifies contacts in the subset $S_0$ that the status of the user device 105 is "discoverable," whereas the presence server 139 notifies those contacts not in the subset $S_0$ that the status of the user device 105 is "not discoverable."

If the user has selected the D2D discovery capability D(b) or D(d) for one or more contacts in the EAB 120, then the D2D capability publisher 210 causes the presence UA 125 to publish the user's status as "Not Discoverable" (or a similar status value) to the presence server 130. This status indicates that the user device 105 does not allow other devices in its surroundings to discover the user device 105. In some examples, the user device 105 may make itself not discoverable to other user devices by not sending out beacon signals to those, or any, other user devices. Alternatively, in some examples, the user device 105 can be made not discoverable to unauthorized devices (but still discoverable to authorized users) by the network 110 not passing beacon information to unauthorized users.

In some examples, D2D capability publisher 210 can cause the presence UA 125 to publish the D2D communication capability information (e.g., the C(a)-C(c) capabilities described above) to the presence server 130. As described above, like the D2D discovery capability information, the D2D communication capability information can be customized for individual contacts and/or groups of contacts (e.g., such as family, friends, business groups, etc.) in the EAB 120.

In some examples, the presence server 130 can be used to propagate changes to a user's D2D discovery capabilities as follows. First, a user of the user device 105 changes, via a UI provided by the D2D capability specifier 205, proximity discovery selection (e.g., discovering and/or discoverable capabilities) for one or more contacts on the EAB 120. This changes the authorization rule for the contacts. Next, the presence UA 120 of the user device 105 publishes this D2D discovery capability information with the presence server 130 by exchanging this D2D discovery capability information with the XDMS 135, which causes the presence policy document stored in the XDMS 135 for the user device 105 and/or the user of the user device 105 to be updated. The XDMS 135 then exchanges the presence policy document updates, including this D2D discovery capability information, for the user device 105 with the presence server 130. The presence server 130 then exchanges the updated presence information, including the updated D2D discovery capability information, with the other device(s) that is (are) subscribed to receive notifications of changes to the presence information for the user device 105.

The example RCS client 115 of FIG. 2 further includes an example D2D proximity indicator 215 to indicate whether other devices supporting D2D functionality are in proximity to the user device 105. In some examples, the D2D proximity indicator 215 indicates such proximity information in the EAB 120 of the user device 105. For example, if the user of the user device 105 has selected D(a) or D(b) for a contact list A in the EAB 120, and the user device 105 has discovered one or more contacts in list A as in proximity, then the D2D proximity indicator 215 can cause an in-proximity indication to be displayed for these one or more contacts in the EAB 120. In some examples, if a contact in the EAB 120 is discoverable and the user has enabled discovering for this contact, then the D2D proximity indicator 215 can cause the contact to be displayed in the EAB 120 as either in proximity for D2D communications or out-of-range. In some examples, the presence UA 125 of the user device 105 can receive, from the presence server 130, discovery capability information for other devices associated with contacts in the EAB 120. In such examples, an indication in the EAB 120 could be provided to show whether a particular contact has or does not have discovery enabled.

In some examples, a list of the contacts in the EAB 120 that are in proximity to the user device 105 is maintained dynamically by the D2D proximity indicator 215. In some examples, the term "in proximity" refers to, for example, two devices being within a distance sufficient for the quality of a D2D link to be above some defined threshold level. For example, this list maintained by the D2D proximity indicator 215, which is referred to herein as a proximity list, can be displayed in the EAB 120 with a visual proximity flag or other indication. The proximity information displayed by the D2D proximity indicator 215 may also have an associated timestamp corresponding to the last time that proximity was determined for the particular contact in the EAB 120. In some examples, the proximity information can be automatically updated (without user interaction once activated) in the EAB 120. In some examples, a user of the user device 105 may have temporarily authorized D2D functionality associated with contacts in the proximity list, and automatic updating of proximity information associated with contacts in this list is performed until one or more pre-defined criteria are satisfied. Such criteria may include, but are not limited to, causing proximity updating to be performed for a particular amount of time, causing proximity updating to be performed within a particular geographic limit, causing proximity updating to be performed until a command is received from a user, causing proximity updating to be performed until a command is received from the network 105, etc.

In order to keep the proximity list up-to-date, the D2D proximity indicator 215 can cause proximity discovery to be performed on the user device 105 using radio signals (e.g., by monitoring for and detecting D2D beacons broadcast by other devices supporting D2D functionality). The proximity discovery can be periodic or triggered. In the periodic case, the periodicity can be set manually by the user or automatically by the network. In the triggered case, the triggering event can be, for example:

(a) Manually triggered by the user via the user interface;
(b) Automatically triggered by the user device 105 because the proximity information timestamp indicates that the proximity information is not up-to-date or "fresh;"
(c) Triggered by network, for example, after the user device 105 has moved and registered with a new basestation (e.g., enhanced NodeB or eNodeB).

As noted above, proximity information maintained by the D2D proximity indicator 215 may also have a timestamp associated with it that might be displayed in the EAB 120 so that the age of proximity information is known to the user. The timestamp could be explicitly displayed in the EAB 120, and/or might be indicated implicitly with a color or symbol that fades in intensity, etc. The contacts which are in proximity to the user device 105 could also be part of the user's presence information that is updated by the presence UA 120 to the presence server 130. This proximity information could be useful in D2D device discovery. For example, if a first contact in the EAB 120 of the user device 105 is in proximity to the user device 105, then any of the contacts of that first contact have a reasonable chance of also being in proximity to the user device 105. As another example, if multiple contacts that are in proximity with the user device 105 have a common contact in proximity, then the probability is even greater that the common contact is in proximity to the user device 105 and that proximity discovery directed at the common device would be fruitful.

In some examples, the RCS client 115 of FIG. 2 includes an example D2D capability signaler 220 in addition to, or as an alternative to, the D2D capability publisher 210, to signal D2D capability information using a SIP-based mechanism. As described above, in some examples, SIP OPTIONS can be used to exchange RCS capability information in addition or as an alternative to exchanging RCS capability information via a presence-based solution. As such, in some examples, the D2D capability signaler 220 can be used to implement a SIP-based solution for signaling D2D capability information, which can be used as an alternative to or in conjunction with a presence-based solution implemented by the D2D capability publisher 210. For example, user devices, such as the user device 105, can include the D2D capability signaler 220 to support the SIP OPTIONS exchange of D2D capability information either as a default or a fallback mechanism (when the presence query fails for a particular user).

In some examples, the D2D capability signaler 220 uses a SIP OPTIONS end-to-end message to query the capabilities (services which the other user has available) of a target contact (or the user device of the target contact) and to pass information about which capabilities are supported by the requesting user device 105 itself. In this way, both endpoints of a potential D2D link obtain updated D2D capability information in a single transaction In some example SIP-based solutions, the SIP tag mechanism employed by RCS can be extended to support D2D functionality by adding a tag for Proximity Service information. In such examples, when the proximity tag is included in a SIP OPTIONS message, the receiving device recognizes the tag and displays the corresponding capability information in its EAB 120. An example of such a proximity tag for inclusion in a SIP OPTIONS message is provided in Table 1.

TABLE 1

| RCS Service | Tag |
| --- | --- |
| Proximity | +g.3gpp.iari-ref="urn%3Aurn-7%3A3gpp-application.ims.iari.rcs.prose" |

To support privacy protection for D2D communications in an RCS context, the example RCS client 115 of FIG. 2 includes an example D2D privacy specifier 225. In the illustrated example, the D2D privacy specifier 225 can address privacy concerns between the user device 105 and other individuals attempting to discover the user device 105, and/or between the user device 105 and other business/commercial entities attempting to discover the user device 105. In the context of privacy protection related to individuals attempting to discover the user device 105, which are also referred to as watchers herein, the D2D privacy specifier 225 enables a user of the user device 105 to specify permissions for contacts in the EAB 120 before the user device 105 can be discovered by those contacts. This gives the user of the user device 105 the ability to prevent illegal or unwanted tracking.

In an example presence-based solution, the D2D privacy specifier 225 prompts a user of the user device 105 to create privacy filtering rules that can be applied to one or more individual watchers and/or one or more groups of watchers, thereby enabling the presence server 130 to generate different presence documents for different watchers. In some such examples, privacy filtering rules are signaled by the D2D privacy specifier 225 for storage in the XDMS 135 as part of the presence authorization rules for the user device 105. The presence server 130 checks the privacy filtering rules when it composes presence documents. In some examples, the permissions for proximity discovery can be included as a component controlled by the privacy policy. For example, the D2D privacy specifier 225 can permit a user (also referred to as a presentity because the user is providing presence information) to specify authorization rules in, for example, the rich presence information data (RPID) format. In some examples, a watcher might not be allowed to try to contact the user device 105 if the watcher is not an entry in the EAB 120 of the device 105. In such examples, the presence server 130 might block a watcher that does not have an entry in the EAB 120 of a user device 105 from attempting to contact the user device 105 for any proximity service.

In the context of privacy protection related to businesses attempting to discover the user device 105, consider the following example scenario. A user of the user device 105 walks in a mall area and businesses (e.g., stores, restaurants, etc.) of interest to the user are displayed by the RCS client 115 on the user device 105 via a proximity service. In this scenario, to protect the privacy of user devices, such as the user device 105, the businesses' D2D-capable device may be allowed to select only the D2D discovery capability setting D(c) (i.e., discovering others is not permitted but being discovered by others is allowed). This D2D discovery capability setting can be enforced by an operator of the network 110, such as by the operators' base stations not providing any D2D discovery assistance to the business' devices. For example, the base station may not provide time-frequency resource, signal format, UE identifier (ID), etc., which the business' device would use to detect the user devices' radio signals (e.g., D2D beacons). In some examples, if a business X is not one of the entries in the EAB 120 of the user device 105, the presence server 130 might not allow business X to discover the user device 105. In some examples, to further protect privacy with respect to business entities, the D2D privacy specifier 225 causes the D2D discovery setting D(b) (i.e., discovering others is permitted but being discovered by others is not allowed) to be selected, by default, for any device indicated in the EAB 120 of the user device as being owned by a business:

An example D2D positioning signaler 230 is included in the example RCS client 115 of FIG. 2 to support enhancement of location services with proximity information associated with D2D functionality. The fact that a first user device is in proximity to a second user device can be used to enhance the location information determined for either or both of these devices. Existing RCS systems include GeoPull and GeoPush services to, respectively, receive geolocation information from and send geolocation information to a network. In such systems, the capability to handle geolocation push messages or geolocation pull requests can be signaled via a uniform resource name (URN) in a SIP OPTIONS request.

When either or both of a first user device and a second user device do not have geolocation information, the proximity information determined for D2D functionality can be used to supplement the missing geolocation information. For example, if a group of contacts share proximity information, then it may be possible to determine the relative location of one or more contacts with respect to other contacts in the group. With this in mind, in some examples, after establishing a D2D discovery or communication relationship between the user device 105 and another user device, the D2D positioning signaler 230 can send proximity information from the user device 105 (e.g., indicating the relative proximity between a user device 105 and the other user device discovered by the user device 105, and/or between which a D2D communication link has been established) to the location services processor 140, which may be implemented by, for example, an Evolved Serving Mobile Location Centre (E-SMLC). Such proximity information can be used by the location services processor 140 to augment (e.g., improve the accuracy and confidence level of) geolocation information being provided to the user device 105 (and/or the other user device) by one or more other positioning methods, such as, observed time difference of arrival (OT-DOA), assisted global navigation satellite system (A-GNSS), enhanced cell ID (ECID), etc. Such accuracy improvement can be achieved in several ways. In one example, if the user device 105 is in proximity to a stationary device (e.g., mounted at a known, fixed location (x, y) by a store or museum), then the location services processor 140 could determine that the user device 105 is within a distance "d" from the stationary device's geolocation (x, y), where d is determined based on proximity information, such as received power level of the stationary device, reported by the D2D positioning signaler 230 for the user device 105. In another example, if the user device 105 has inferior positioning capability (e.g., has no GPS capability), and the proximity information reported by the D2D positioning signaler 230 indicates that the user device 105 is in proximity to another device that has superior location capability, then the location of the user device 105 can be derived by the location services processor 140 more accurately based on the geolocation information determined for the other device.

Additionally or alternatively, in some examples, the user device 105 might use the location information of contacts in proximity to perform beam-forming and transmit directed antenna signals when engaged in D2D communication in order to save power. As another example, the user device 105 might display to the user a map with the locations of contacts in proximity.

In some examples, a RequestCapabilities message body in an LTE positioning protocol (LPP) message is used by the location services processor 140 to request the target device capability information for LPP and the supported individual positioning methods. As shown in Table 2, this message can be enhanced to include the proximity-RequestCapabilities information element (IE), which can be set by the location services processor 140 to request whether the user device 105 supports providing the proximity of the user device 105 relative to other user devices.

The CommonIEsProvideLocationInformation carries common IEs for a Provide Location Information LPP message Type. As shown in Table 4, this message can be enhanced to include a proximity IE, which can be used by the D2D positioning signaler 230 to provide the position of the user device 105 relative to other user devices.

TABLE 4

```
CommonIEsProvideLocationInformation ::= SEQUENCE {
        locationEstimate      LocationCoordinates    OPTIONAL,
        velocityEstimate      Velocity               OPTIONAL,
        locationError         LocationError          OPTIONAL,
        proximity             ProximityUEIDList      OPTIONAL,
        ...
}
```

To support mobility, in some examples, proximity information displayed by the D2D proximity indicator 215 in the EAB 120 of the user device 105 can be updated when the user device 105 moves. For example, when the user device 105, which is participating in D2D communications, moves, the proximity information maintained and displayed by the D2D proximity indicator 215 can be updated by having the D2D proximity indicator 215 cause the user device 105 to scan for radio signals sent by other users in the vicinity of the user device 105. For example, the user device 105 can scan for D2D beacons broadcast by devices supporting D2D.

A further example of such mobility processing is as follows:

TABLE 2

```
RequestCapabilities-r9-IEs ::= SEQUENCE {
        commonIEsRequestCapabilities    CommonIEsRequestCapabilities     OPTIONAL,    -- Need ON
        a-gnss-RequestCapabilities      A-GNSS-RequestCapabilities       OPTIONAL,    -- Need ON
        otdoa-RequestCapabilities       OTDOA-RequestCapabilities        OPTIONAL,    -- Need ON
        ecid-RequestCapabilities        ECID-RequestCapabilities         OPTIONAL,    -- Need ON
        proximity-RequestCapabilities   PROXIMITY-RequestCapabilities    OPTIONAL,    -- Need ON
        epdu-RequestCapabilities        EPDU-Sequence                    OPTIONAL,    -- Need ON
        ...
}
```

After receiving the RequestCapabilities message body including the proximity-RequestCapabilities IE described above, the D2D positioning signaler 230 of the user device 105 can include a response in an enhanced ProvideCapabilities message body of a LPP message, which indicates the LPP capabilities of the target device to the location server. As shown in Table 3, this message can be enhanced to include a proximity-ProvideCapabilities IE, which is set by the D2D positioning signaler 230 to indicate whether a user device 105 supports providing the proximity of the user device 105 relative to other user devices.

1) The user device 104 turns on D2D discovering service.

2) The serving base station signals of the user device 105 signals to the user device 105 the device parameters of the D2D beacon for a second user device, where the second user device is associated with a contact in the EAB 120 of the user device 105.

3) The user device 105 detects the D2D beacon of the second user device. The user device 105 displays in its EAB 120 that the contact associated with the second user device is in proximity by adding a proximity indicator. Examples of proximity indicators include, but are not limited to, a marker

TABLE 3

```
ProvideCapabilities-r9-IEs ::= SEQUENCE {
        commonIEsProvideCapabilities    CommonIEsProvideCapabilities     OPTIONAL,
        a-gnss-ProvideCapabilities      A-GNSS-ProvideCapabilities       OPTIONAL,
        otdoa-ProvideCapabilities       OTDOA-ProvideCapabilities        OPTIONAL,
        ecid-ProvideCapabilities        ECID-ProvideCapabilities         OPTIONAL,
        proximity-ProvideCapabilities   PROXIMITY-ProvideCapabilities    OPTIONAL,
        epdu-ProvideCapabilities        EPDU-Sequence                    OPTIONAL,
        ...
}
```

(e.g., red star) being added to the contact's entry in the EAB 120, a font size for the contact's name being changed, a background of the contact's entry being changed in the EAB 120, etc., or any combination thereof. The user device 105 can record a timestamp when the second user device enters the "in-proximity" state relative to the user device 105. The user device 105 can report to its base station that the D2D beacon of the second user device has been detected, and might also report the timestamp. In some examples, the detected power level of the second user device's D2D beacon can be reported as well. In some examples, the detected power level of the second user device's D2D beacon can be used by the base station to decide if the base station needs to adjust the power level of second user device's D2D beacon.

4) As user device 105 and/or the second user device move away from each other, the user device 105 detects that the received beacon signal power level from the second user device 105 has weakened below a threshold.

5) The user device 105 can display in its EAB 103 that the contact associated with the second user device is not in proximity by removing the proximity indicator from the contact's entry in the EAB 120. In some examples, the user device 105 can record a timestamp for when the second user device moves from the "in-proximity" state to "not-in-proximity" state. The user device 105 can report to the base station that the second user device's beacon is no longer detected and, in some examples, might also report the timestamp.

Timestamps determined for D2D proximity information, such as the timestamps described above that are associated with changes in proximity states, can be used to assist future D2D communications. For example, contacts that were recorded as "in-proximity" by the user device 105 in the previous X seconds (e.g., where X=3600 or some other value) can be automatically scanned by the user device 105 for discovery purposes. In contrast, when a contact was not "in-proximity" in the previous X seconds, the user device 105 might, for example, not automatically scan for that contact unless the user configures the user device 105 otherwise. In some examples, the settings for when to automatically scan can be user and/or network configurable.

Figure 3:
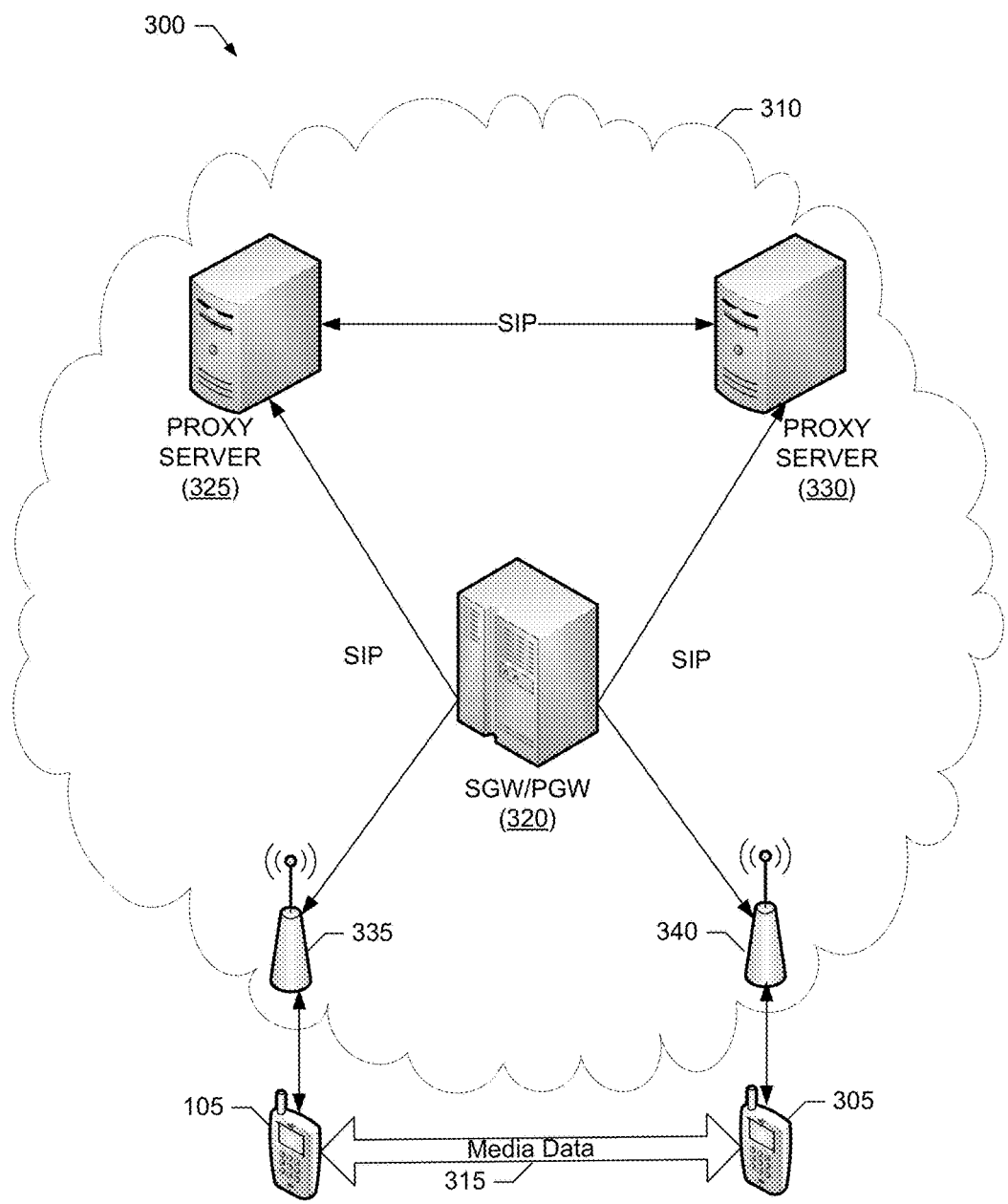
FIG. 3 is a block diagram illustrating establishment of a device-to-device link in a second example system supporting device-to-device communication.

A block diagram of a second example system 300 supporting D2D communication in an RCS context as disclosed herein is illustrated in FIG. 3. The system 300 of the illustrated example includes the example user device 105 of FIG. 1, an example user device 305 and an example communication network 310. The user device 305 may be similar to or different from the user device 105, but includes and/or implements one or more of the example methods, apparatus and/or articles of manufacture (e.g., storage media) disclosed herein for supporting D2D communication in an RCS context. The network 310 may be similar to or different from the network 110 of FIG. 1, but includes and/or implements one or more of the example methods, apparatus and/or articles of manufacture (e.g., storage media) disclosed herein for supporting D2D communication in an RCS context.

In the example system 300 of FIG. 3, after an example D2D communication link 315 is established directly between the two user devices 105 and 305, the SIP messaging for establishment and termination of RCS services, including a D2D service, still traverses the operator's network 310, including example gateways 320 and example proxy servers 325, 330 included in the network 310. After a D2D service is established over the D2D link 315, the actual user data (e.g., media data), such as instant messages, videos, file transfers, etc., can then be sent directly between the devices. Also, in the example system 300 of FIG. 3, the two devices 105, 305 are connected to two neighboring eNBs 335, 340, and the common gateway 320 is able to help establish the D2D link 315. Other configurations are possible. For example, two devices belonging to two different PLMNs, two devices belonging to the same PLMNs, two devices connected to a same eNB, two devices connected to two separate gateways, etc., are also possible. Furthermore, in some examples, if the devices are in proximity, the network nodes can assist the devices in authenticating/authorizing each other, exchanging connection parameters, managing transmission resources (for example time, frequency, power, RAT), etc. Also, while only two user devices 105, 305 are illustrated in the example system 300 of FIG. 3, more devices can be included in the D2D link 315 to, for example, enable one device to connect to multiple devices in proximity in a multicast or broadcast session.

In some example D2D solutions, the D2D capabilities available and displayed to a user A of a first user device A for a contact B can be different depending on if a second user device associated with contact B is in proximity to the first user device. For example, if the first and second user devices are in proximity to each other, a D2D capability (e.g., video share) may be displayed as a capability of contact B in user A's EAB on the first user device. However, for other users, this D2D capability of contact B (e.g., user B's video share capability) may be displayed as "no" or "not available" (or some other similar value) if, for example, the second user device is not within D2D range of the other users. These D2D capabilities may be user configurable or network configurable according to proximity and/or radio access technology. For example, user B may not want to display its video share or image share capability unless other users are within D2D range and/or using a particular radio access technology (e.g., WLAN). In another example, these D2D capabilities may depend not only on the presence of a D2D link, but also on a given signal strength, signal-to-noise ratio (SNR), throughput, or other measures of link quality. Thus the D2D service capability can be made more accurate by real-time link-capacity estimates, taking into account the channel quality between two devices, the amount of radio resource the network is able to allocate, power limitations of the devices, interference considerations, etc. The D2D capabilities themselves may be enabled/disabled according to proximity or just the actual display of the capabilities may be enabled/disabled according to proximity. These D2D capabilities may also be customizable on a per contact and/or per contact group basis.

In some example D2D solutions, when two devices are in proximity to each other and attempt to establish a D2D link for communication, SIP messages can be exchanged between the devices to establish the connection. When the SIP OPTIONS message is sent from a first user device to a second user device (e.g., via the IMS core) to check D2D link capability, the capability can be indicated in a SIP OK response message. The capability in the reply can depend on, for example, whether the D2D link still exists, the throughput level of the D2D link relative to different payload types (e.g., text, image, video, etc.), the quality of service (QoS) levels possible on the D2D link, etc.

In some examples, it is possible for two devices to discover each other and set up a D2D link without user input. The two user devices can then exchange files/images/videos with each other via the D2D link without going through the network. When a D2D link is established, the EAB on each user device can display high levels of D2D capabilities (e.g., video share) being associated with the other user device, although their capabilities shown to other users may be more limited. Two sets of capabilities (possibly even on a per-contact and/or contact group basis) can therefore be maintained according to whether or not the two users are in proximity.

While example manners of implementing the example systems 100, 300 are illustrated in FIGS. 1-3, one or more of the elements, processes and/or devices illustrated in FIGS. 1-3 may be combined, divided, re-arranged, omitted, eliminated and/or implemented in any other way. Further, the example user device 105, the example communication network 110, the example RCS client 115, the example EAB 120, the example presence UA 125, the example presence server 130, the example XDMS 135, the example location services processor 140, the example D2D capability specifier 205, the example D2D capability publisher 210, the example D2D proximity indicator 215, the example D2D capability signaler 220, the example D2D privacy specifier 225, the example D2D positioning signaler 230, the example address book interface 235, the example presence UA interface 240, the example user device 305, the example communication network 310, the example gateways 320, the example proxy servers 325, 330, the example eNBs 335, 340 and/or, more generally, the example systems 100 and/or 300 may be implemented by hardware, software, firmware and/or any combination of hardware, software and/or firmware. Thus, for example, any of the example user device 105, the example communication network 110, the example RCS client 115, the example EAB 120, the example presence UA 125, the example presence server 130, the example XDMS 135, the example location services processor 140, the example D2D capability specifier 205, the example D2D capability publisher 210, the example D2D proximity indicator 215, the example D2D capability signaler 220, the example D2D privacy specifier 225, the example D2D positioning signaler 230, the example address book interface 235, the example presence UA interface 240, the example user device 305, the example communication network 310, the example gateways 320, the example proxy servers 325, 330, the example eNBs 335, 340 and/or, more generally, the example systems 100 and/or 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example systems 100 and/or 300, the example user device 105, the example communication network 110, the example RCS client 115, the example EAB 120, the example presence UA 125, the example presence server 130, the example XDMS 135, the example location services processor 140, the example D2D capability specifier 205, the example D2D capability publisher 210, the example D2D proximity indicator 215, the example D2D capability signaler 220, the example D2D privacy specifier 225, the example D2D positioning signaler 230, the example address book interface 235, the example presence UA interface 240, the example user device 305, the example communication network 310, the example gateways 320, the example proxy servers 325, 330 and/or the example eNBs 335, 340 is/are hereby expressly defined to include a tangible computer readable storage device or storage disk such as a memory, a digital versatile disk (DVD), a compact disk (CD), a Blu-ray disk, etc. storing the software and/or firmware. Further still, the example systems 100 and/or 300 may include one or more elements, processes and/or devices in addition to, or instead of, those illustrated in FIGS. 1-3, and/or may include more than one of any or all of the illustrated elements, processes and devices.

Figure 4:
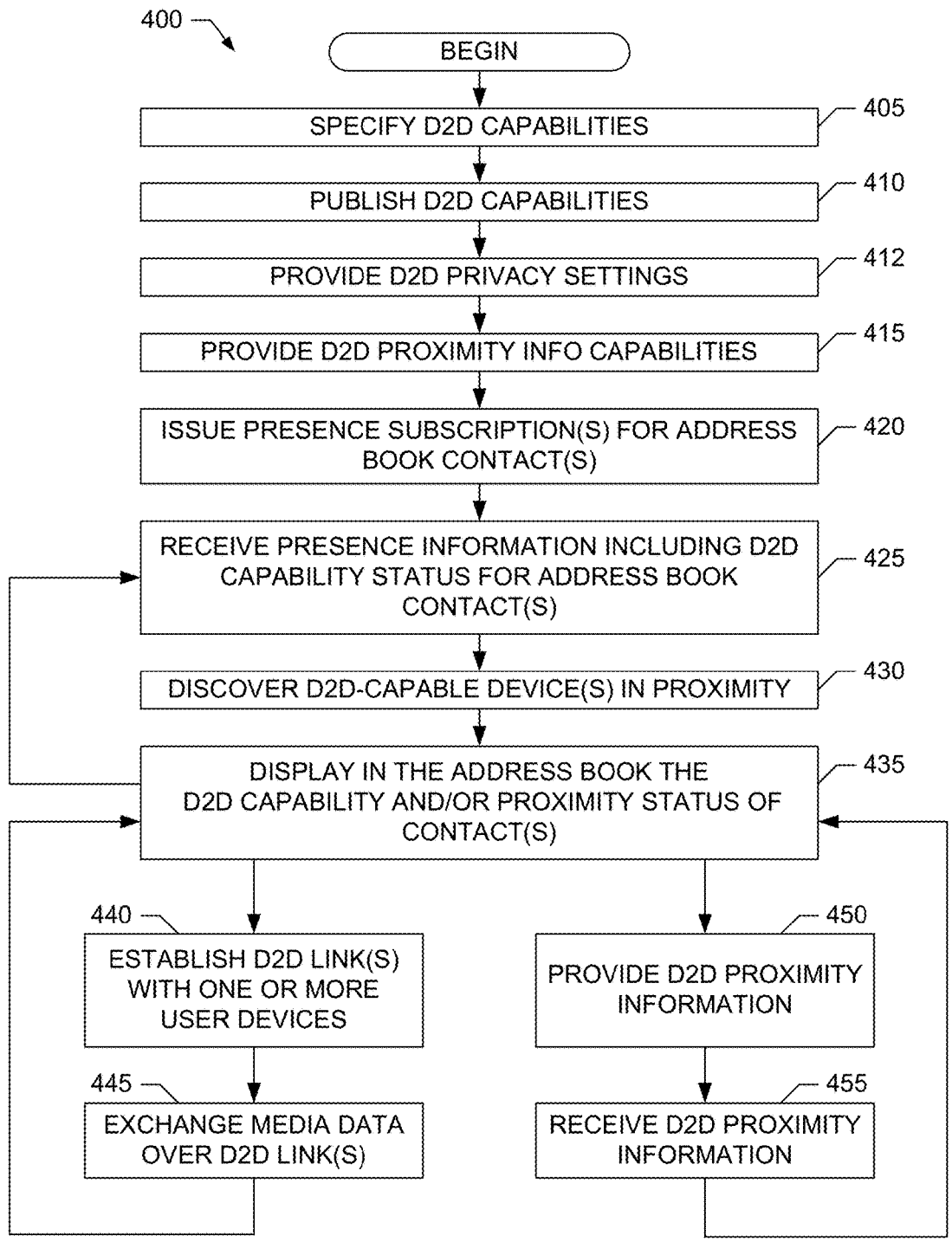
FIG. 4 is a flowchart representative of an example process that may be performed to implement the example rich communication services client of FIG. 2 and/or the example user device of FIG. 1.
Figure 5:
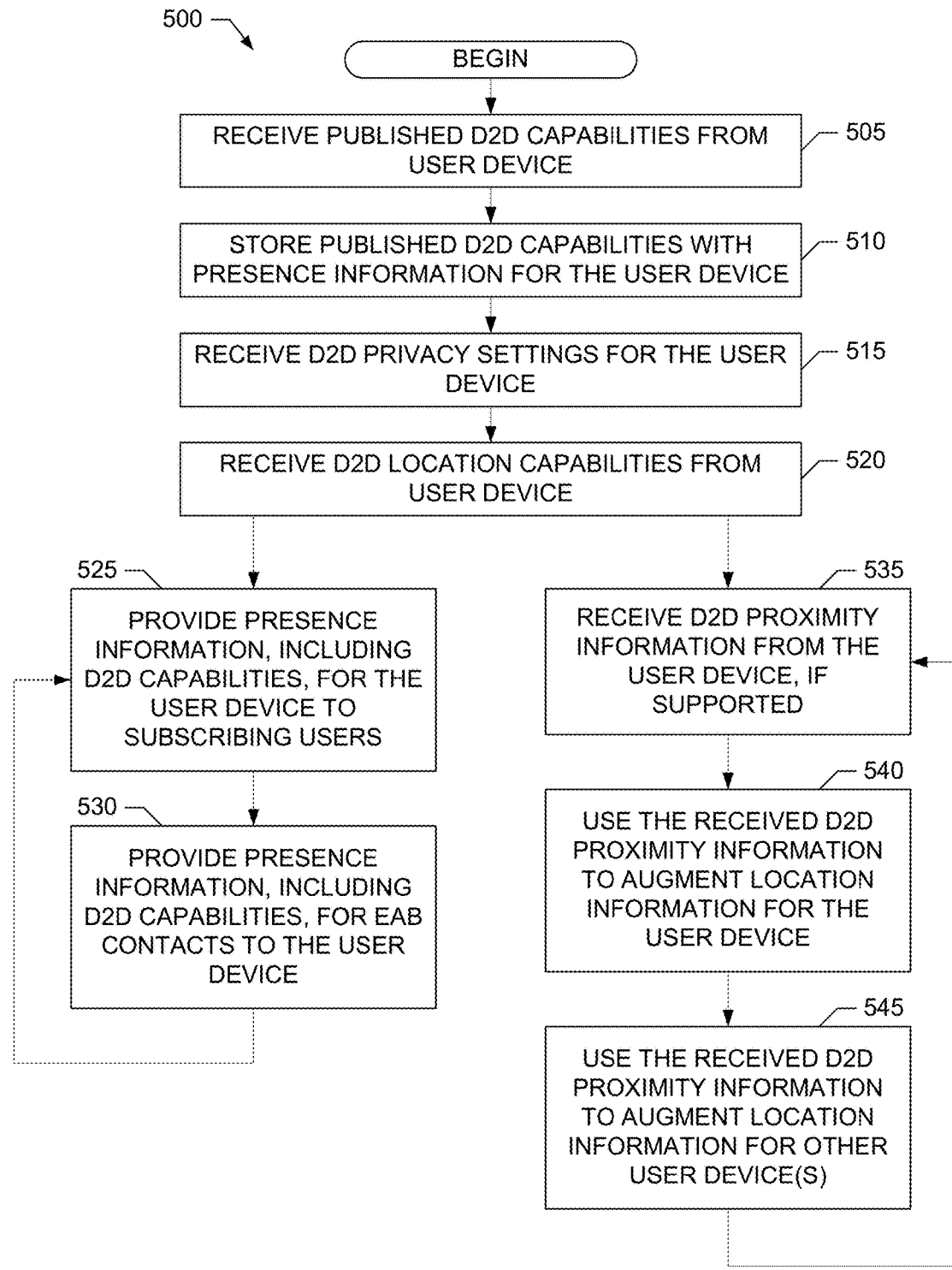
FIG. 5 is a flowchart representative of an example process that may be used to implement network processing to support device-to-device communication in the example systems of FIGS. 1 and/or 3.

Flowcharts representative of example processes for implementing the example systems 100 and/or 300, the example user device 105, the example communication network 110, the example RCS client 115, the example EAB 120, the example presence UA 125, the example presence server 130, the example XDMS 135, the example location services processor 140, the example D2D capability specifier 205, the example D2D capability publisher 210, the example D2D proximity indicator 215, the example D2D capability signaler 220, the example D2D privacy specifier 225, the example D2D positioning signaler 230, the example address book interface 235, the example presence UA interface 240, the example user device 305, the example communication network 310, the example gateways 320, the example proxy servers 325, 330 and/or the example eNBs 335, 340 of FIGS. 1-3 are shown in FIGS. 4-5. In these examples, the process represented by each flowchart may be implemented by one or more programs comprising machine readable instructions for execution by a processor, such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program(s) and/or parts thereof could alternatively be executed by a device other than the processor 612 and/or embodied in firmware or dedicated hardware. Further, although the example program(s) is (are) described with reference to the flowcharts illustrated in FIGS. 4-5, many other methods of implementing the example systems 100 and/or 300, the example user device 105, the example communication network 110, the example RCS client 115, the example EAB 120, the example presence UA 125, the example presence server 130, the example XDMS 135, the example location services processor 140, the example D2D capability specifier 205, the example D2D capability publisher 210, the example D2D proximity indicator 215, the example D2D capability signaler 220, the example D2D privacy specifier 225, the example D2D positioning signaler 230, the example address book interface 235, the example presence UA interface 240, the example user device 305, the example communication network 310, the example gateways 320, the example proxy servers 325, 330 and/or the example eNBs 335, 340 may alternatively be used. For example, the order of execution of the blocks may be changed, and/or some of the blocks described may be changed, eliminated, or combined.

As mentioned above, the example processes of FIGS. 4-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 4-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

An example process 400 that may be executed in the user device 105 to implement D2D communication support in an RCS context is illustrated in FIG. 4. With reference to the preceding figures and associated descriptions, the example process 400 of FIG. 4 begins execution at block 405 at which the D2D capability specifier 205 of the RCS client 115 in the user device 105 specifies D2D capabilities (e.g., D2D discovery capabilities and/or D2D communication capabilities) to be associated with one or more contacts and/or contact groups in the EAB 120 of the user device 105, as described above. At block 410, the D2D capability publisher 210 of the RCS client 115 in the user device 105 publishes the D2D capability information specified at block 405 to the presence server 130 of the communication network 110, as described above. At block 412, the D2D privacy specifier 225 of the RCS client 115 in the user device 105 provides privacy settings associated with D2D capabilities of the user device 105 to the XDMS 135 of the communication network 110, as described above. At block 415, the D2D positioning signaler 230 of the RCS client 115 in the user device 105 provides the proximity information capabilities of the user device 105 to the location services processor 140 of the communication network 110, as described above. At block 420, the RCS client 115 in the user device 105 issues one or more presence subscriptions to subscribe to notifications of presence information for one or more contacts included in the EAB 120 of the user device 105.

At block 425, the RCS client 115 in the user device 105 receives presence information, including D2D capability status for one or more contacts and/or contact groups in the user device's EAB 120, from the presence server 130, as described above. At block 430, the user device 105 uses the D2D capability status available in its EAB 120 to discover any D2D-capable user devices in proximity to the user device 105. At block 435, the D2D proximity indicator 215 of the RCS client 115 in the user device 105 displays, in the EAB 120 of the user device 105, the D2D capability and/or proximity status of the user device's EAB contacts, as described above. Processing can then continue iterating over blocks 425-435 to enable the D2D capability and/or proximity status of the contacts in the EAB 120 of the user device 105 to be updated.

From block 435, processing can also proceed to block 440 at which the RCS client 115 causes the user device 105 to establish D2D link(s) with one or more other user devices associated with contacts in the EAB 120 of the user device 105, as described above. At block 445. The user device 105 exchanges media data over the D2D link(s) established at block 440 to receive proximity services and applications from other D2D-capable devices in proximity to the user device 105. Processing can then continue iterating over blocks 435-445 to enable other D2D link(s) to be established with other D2D-capable device(s) in proximity to the user device 105.

From block 435, processing can also proceed to block 450 at which D2D positioning signaler 230 of the RCS client 115 in the user device 105 provides D2D proximity information to the location services processor 140, as described above. In some examples, at block 455 the D2D positioning signaler 230 also receives proximity information for other user devices (e.g., in the vicinity of the user device 105) from the location services processor 140. Processing can then continue iterating over blocks 435, 450 and 455 to enable the D2D positioning signaler 230 to exchange D2D proximity information with the location services processor 140.

An example process 500 that may be executed in the communication network 110 to implement D2D communication support in an RCS context is illustrated in FIG. 5. With reference to the preceding figures and associated descriptions, the example process 500 of FIG. 5 begins execution at block 505 at which the presence server 130 of the communication network 110 receives D2D capability information (e.g., D2D capability information and/or D2D capability information) published by the user device 105, as described above. At block 510, the D2D capability information published by the user device 105 at block 505 is stored in the XDMS 135 of the communication network 110. For example, and as described above, the D2D capability information published by the user device 105 can be stored in a presence document maintained at the XDMS 135 for storing presence information associated with the user device 105. At block 515, the XDMS 135 receives D2D privacy settings for the user device 105, as described above. At block 520, the location services processor 140 of the communication network 110 receives D2D location capability information from the user device 105, as described above.

At block 525, the presence server 130 processes the presence document stored in the XDMS 135 for the user device 105 and provides presence information, including D2D capability information, for the user device 105 to other user devices that have subscribed for this presence information, as described above. At block 530, the presence server 130 processes the presence document(s) stored in the XDMS 135 for contact(s) in the EAB 120 of the user device 105 and provides presence information, including D2D capability information, for these contacts to the user device 105, as described above. Processing can then continue iterating over blocks 525 and 530 to enable the presence server 130 to continue providing updated presence information to the user devices in the communication network 110.

In some examples, at block 535, the location services processor 535 receives D2D proximity information from the user device 105, as described above. At block 540, the location services processor 535 uses the proximity information received at block 535 to augment location/positioning information determined for the user device 105, as described above. At block 545, the location services processor 535 uses the proximity information received at block 535 to augment location/positioning information for other user device(s), such as user device(s) in the vicinity of the user device 105, as described above. Processing can then continue iterating over blocks 535-545 to enable the location services processor 535 to continue receiving and processing D2D proximity information.

Figure 6:
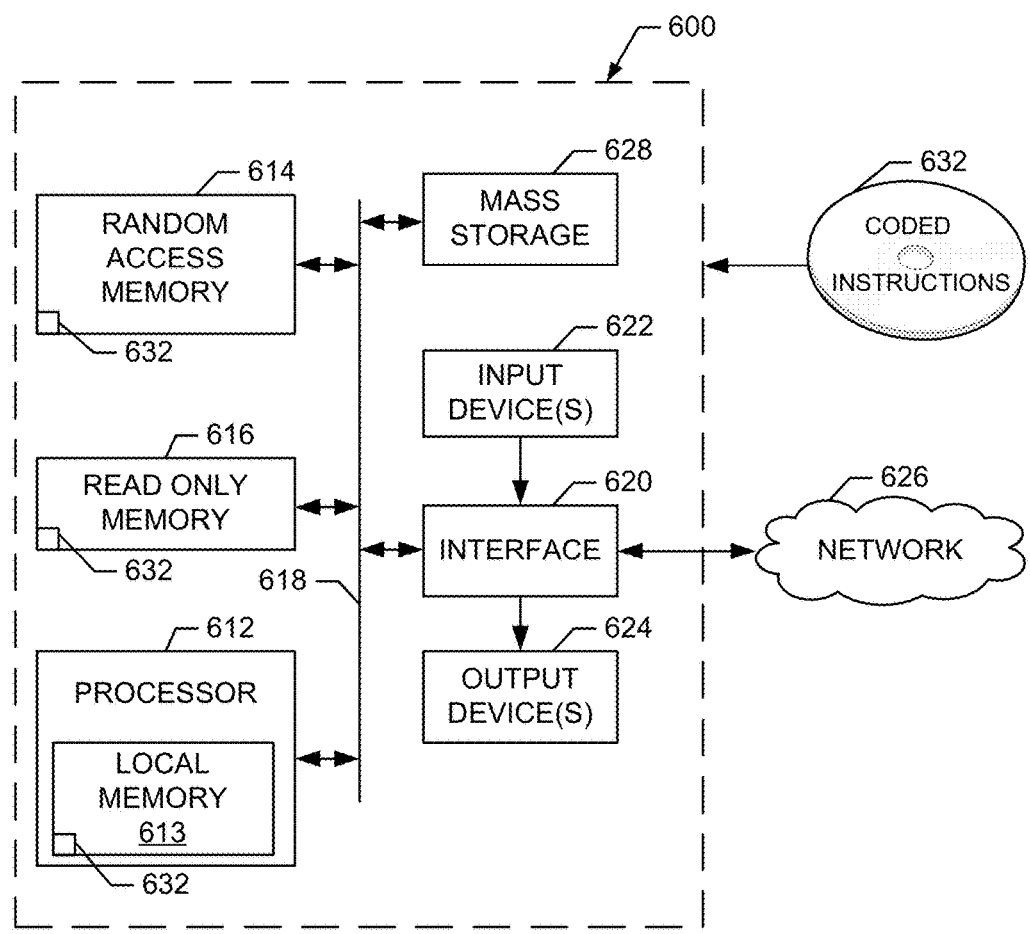
FIG. 6 is a block diagram of an example processing system that may execute example machine readable instructions used to implement some or all of the processes of FIGS. 4 and/or 5 to implement the example rich communication services client of FIG. 2, the user device of FIG. 1 and/or the example systems of FIGS. 1 and/or 3.

FIG. 6 is a block diagram of an example processor platform 600 capable of executing the instructions of FIGS.

4-5 to implement the example systems 100 and/or 300, the example user device 105, the example communication network 110, the example RCS client 115, the example EAB 120, the example presence UA 125, the example presence server 130, the example XDMS 135, the example location services processor 140, the example D2D capability specifier 205, the example D2D capability publisher 210, the example D2D proximity indicator 215, the example D2D capability signaler 220, the example D2D privacy specifier 225, the example D2D positioning signaler 230, the example address book interface 235, the example presence UA interface 240, the example user device 305, the example communication network 310, the example gateways 320, the example proxy servers 325, 330 and/or the example eNBs 335, 340 of FIGS. 1-3. The processor platform 600 can be, for example, a mobile device (e.g., a smart phone, a cell phone, a tablet device, etc.), a server, a personal computer, a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 used to implement the processes of FIGS. 4-5 may be stored in the mass storage device 628, in the volatile memory 614, in the non-volatile memory 616, and/or on a removable tangible computer readable storage medium such as a CD or DVD.

As an alternative to implementing the methods and/or apparatus described herein in a system such as the processing system of FIG. 6, the methods and or apparatus described herein may be embedded in a structure such as a processor and/or an ASIC (application specific integrated circuit).

From the foregoing, it will be appreciated that example solutions for enhancing RCS with D2D communication support have been disclosed. Some such example solutions include integrating D2D discovery and/or communication capabilities into an EAB associated with an RCS. Example disclosed methods to implement such solutions include specifying, in an EAB of a device, discovery capability information for the device, the discovery capability information being associated with D2D functionality supported by the device. For example, the discovery capability information can include one or more of: (a) a first discovery capability specifying that the device can discover one or more other devices and that the device is to be discoverable by the one or more other devices; (b) a second discovery capability specifying that the device can discover the one or more other devices but that the device is not be discoverable by the one or more other devices, (c) a third discovery capability specifying that the device cannot discover one or more other devices but that the device is to be discoverable by the one or more other devices; and (d) a fourth discovery capability specifying that the device cannot discover one or more other devices and that the device is not to be discoverable by the one or more other devices. In some examples, the discovery capability information is specified differently for two different contacts in the EAB. Some such example methods also include specifying, via the EAB of the device, communication capability information for the device, the communication capability information being associated with the D2D functionality supported by the device. The specified communication capability is then shared with other users via the communications network. For example, the communication capability information can include one or more of: (a) a first communication capability specifying that the device can perform D2D communication via only a first type of RAT; (b) a second communication capability specifying that the device performs D2D communication via a plurality of types of RATs; and (c) a third communication capability specifying that the device does not perform D2D communication via any type of RAT. In some examples, the communication capability information is specified differently for two different contacts in the EAB.

Other such example solutions involve including D2D discovery and/or communication capabilities into RCS presence information associated with a device. Example disclosed methods to implement such solutions include publishing, to a presence server, first discovery capability information for a first device, the first discovery capability information being associated with D2D functionality supported by the first device. For example, the discovery capability information can include one or more of: (a) first information indicating whether the first device is enabled to discover one or more other devices in proximity to the first device; and (b) second information indicating whether the first device is allowed to be discovered by the one or more other devices in proximity to the first device. Some such example methods also include receiving, from the presence server, second discovery capability information for a second device associated with a contact in an EAB of the first device, the second discovery capability information being associated with D2D functionality supported by the second device. In such examples, the second discovery capability information can be used to indicate, in the EAB, whether the contact does or does not have discovery capability enabled.

In some such examples, privacy permissions can be enforced through the use of privacy filtering rules stored in an XDMS. In such example, the presence server can access the XDMS and process the privacy filtering rule(s) specified for the second device when composing a presence document, to be sent to the first device, containing the second discovery capability information associated with the second device.

Other such example solutions involve enhancing location service information with proximity information determined by a first device to support D2D functionality. Example disclosed methods to implement such solutions include determining, at the first device, proximity information relative to a second device discovered by the first device, the second device supporting D2D functionality. Such example methods also include reporting the proximity information to a location service processor, such as an E-SMLC. In such examples, the proximity information is to be used to determine a position of the first device. For example, the location service processor can augment positioning information already determined for the second device with the proximity information reported by the first device to determine the position of the first device.

It is also understood that any of the example methods disclosed above can be implemented by operations performed by a machine in response to executing machine-readable instructions. In some examples, one or more of the example methods/solutions disclosed herein can correspond to and/or be implemented by operations performed by a suitably configured apparatus, such as an example user agent implemented by hardware and/or a processor with memory, employed in/by a user device (e.g., a UE, a mobile device, etc.), and/or by hardware and/or a processor with memory employed in a network element (e.g., such as a presence server, an XDMS, a location services processor, etc.).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for a first mobile device, the method comprising:
    sending, from the first mobile device to a network node, first device-to-device capability information for the first mobile device, the first device-to-device capability information including operating parameters for the first mobile device to wirelessly communicate directly with another device, wherein the first device-to-device capability information includes an indicator indicating whether the first mobile device is able to discover one or more other devices in proximity to the first mobile device using proximity discovery based on device-to-device radio signals, and the first device-to-device capability information also includes communication capability information of the first mobile device, the communication capability information of the first mobile device including a first radio access technology (RAT) through which the first mobile device is able to directly communicate with another device;
    receiving, from the network node, second device-to-device capability information for a second mobile device associated with a contact stored in the first mobile device, the second device-to-device capability information including parameters for the second mobile device to wirelessly communicate directly with another device, wherein the second device-to-device capability information includes an indicator indicating whether the second mobile device permits one or more other devices to discover the second mobile device using proximity discovery based on device-to-device radio signals, and the second device-to-device capability information also includes communication capability information of the second mobile device, the communication capability information of the second mobile device including a second RAT through which the second mobile device is able to directly communicate with another device;
    storing the second device-to-device capability information for the second mobile device in an address book in the first mobile device;
    determining, at the first mobile device, based on the second device-to-device capability information stored in the address book and the first device-to-device capability information, whether the second mobile device is discoverable by the first mobile device and whether the first RAT matches the second RAT;
    in response to determining that the second mobile device is discoverable by the first mobile device and that the first RAT matches the second RAT, determining, by the first mobile device, whether the second mobile device is in proximity to the first mobile device using the first RAT; and
    in response to determining that the second mobile device is in proximity to the first mobile device, setting an indicator in the address book of the first mobile device to indicate that a proximity service associated with the second mobile device is available,
    wherein the proximity service involves the first mobile device to establish a device-to-device communication link to directly communicate media file sharing with the second mobile device.

2. The method as defined in claim 1, wherein the first device-to-device capability information indicates whether the first mobile device permits one or more other devices to discover the first mobile device.

3. The method as defined in claim 1, further comprising using the second device-to-device capability information to indicate in the address book whether the second mobile device is discoverable.

4. The method as defined in claim 1, wherein the first device-to-device capability information includes discovery capability information, and the method further comprises specifying the discovery capability information in the address book of the first mobile device.

5. The method as defined in claim 4, wherein the discovery capability information includes at least one of:
- a second discovery capability specifying that the first mobile device is able to discover the one or more other devices, and that the first mobile device does not permit the one or more other devices to discover the first mobile device; or
- a third discovery capability specifying that the first mobile device is not to discover the one or more other devices, and that the first mobile device permits the one or more other devices to discover the first mobile device.

6. The method as defined in claim 4, wherein specifying the discovery capability information in the address book of the first mobile device comprises:
- associating a first discovery capability information for the first mobile device with a first contact in the address book.

7. The method as defined in claim 1, further comprising specifying the communication capability information of the first mobile device in the first mobile device.

8. The method as defined in claim 7, wherein specifying the communication capability information in the address book of the first mobile device comprises:
- associating first communication capability information for the first mobile device with a first contact in the address book; and
- associating second communication capability information for the first mobile device with a second contact in the address book, the second communication capability information being different from the first communication capability information.

9. The method as defined in claim 1, further comprising:
- discovering the second mobile device;
- determining proximity information between the first mobile device and the second mobile device; and
- reporting the proximity information to a location service processor.

10. A method for a network, the method comprising:
- receiving, from a first mobile device, first device-to-device capability information for the first mobile device, the first device-to-device capability information including operating parameters for the first mobile device to wirelessly communicate directly with another device, wherein the first device-to-device capability information includes an indicator indicating whether the first mobile device is able to discover one or more other devices in proximity to the first mobile device using proximity discovery based on device-to-device radio signals, and the first device-to-device capability information also includes communication capability information of the first mobile device, the communication capability information of the first mobile device including a first radio access technology (RAT) through which the first mobile device is able to directly communicate with another device; and
- sending, to the first mobile device, second device-to-device capability information for a second mobile device associated with a contact stored in the first mobile device, the second device-to-device capability information including operating parameters for the second mobile device to wirelessly communicate directly with another device, wherein the second device-to-device capability information includes an indicator indicating whether the second mobile device permits one or more other devices to discover the second mobile device using proximity discovery based on device-to-device radio signals, and the second device-to-device capability information also includes communication capability information of the second mobile device, the communication capability information of the second mobile device including a second RAT through which the second mobile device is able to directly communicate with another device, and the second device-to-device capability information for the second mobile device stored in an address book in the first mobile device,
- and wherein the first mobile device, based on the second device-to-device capability information stored in the address book and the first device-to-device capability information, determines whether the second mobile device is discoverable by the first mobile device and whether the first RAT matches the second RAT, wherein the first mobile device, in response to determining that the second mobile device is discoverable by the first mobile device and that the first RAT matches the second RAT, determines whether the second mobile device is in proximity to the first mobile device using the first RAT, and wherein the first mobile device, in response to determining that the second mobile device is in proximity to the first mobile device, sets an indicator in the address book of the first mobile device to indicate that a proximity service associated with the second mobile device is available,
- wherein the proximity service involves the first mobile device to establish a device-to-device communication link to directly communicate media file sharing with the second mobile device.

11. The method as defined in claim 10, wherein the first device-to-device capability information indicates whether the first mobile device permits one or more other devices to discover the first mobile device.

12. The method as defined in claim 10, wherein the first device-to-device capability information includes discovery capability information, and the discovery capability information includes at least one of:
- a first discovery capability specifying that the first mobile device is able to discover the one or more other devices and that the first mobile device permits the one or more other devices to discover the first mobile device;
- a second discovery capability specifying that the first mobile device is able to discover the one or more other devices, and that the first mobile device does not permit the one or more other devices to discover the first mobile device;
- a third discovery capability specifying that the first mobile device is not to discover the one or more other devices, and that the first mobile device permits the one or more other devices to discover the first mobile device; or
- a fourth discovery capability specifying that the first mobile device is not to discover the one or more other devices and that the first mobile device does not permit the one or more other devices to discover the first mobile device.

13. The method as defined in claim 10, wherein the first device-to-device capability information is stored in a first presence document associated with the first mobile device, and the method further comprises:
- receiving, from the first mobile device, a privacy filtering rule associated with a device-to-device functionality supported by the first mobile device;
- storing the privacy filtering rule with presence authorization rules associated with the first presence document; and evaluating the privacy filtering rule when providing presence information, including at least a portion of the first device-to-device capability information, to a third mobile device.

14. The method as defined in claim 10, further comprising:
receiving proximity information from the first mobile device, the proximity information indicating whether the second mobile device is in proximity to the first mobile device; and
augmenting positioning information determined for the second mobile device with the proximity information received from the first mobile device to determine a position of the first mobile device.

* * * * *